W. A. GREAVES.
TAIL STOCK.
APPLICATION FILED MAR. 26, 1910.
1,005,538.
Patented Oct. 10, 1911.
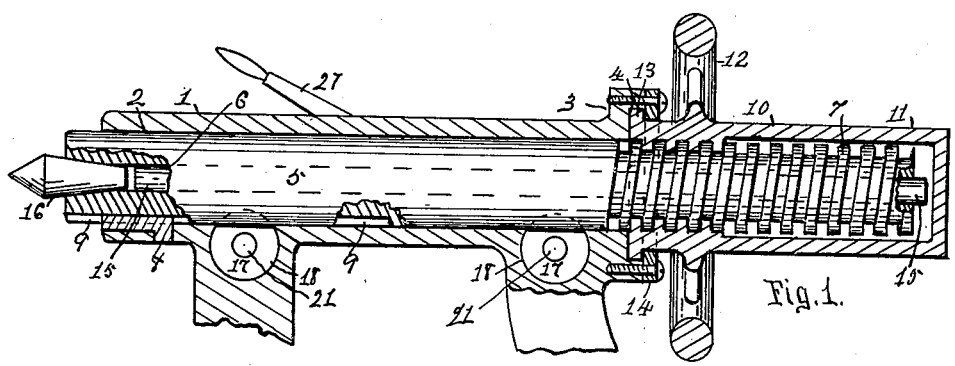
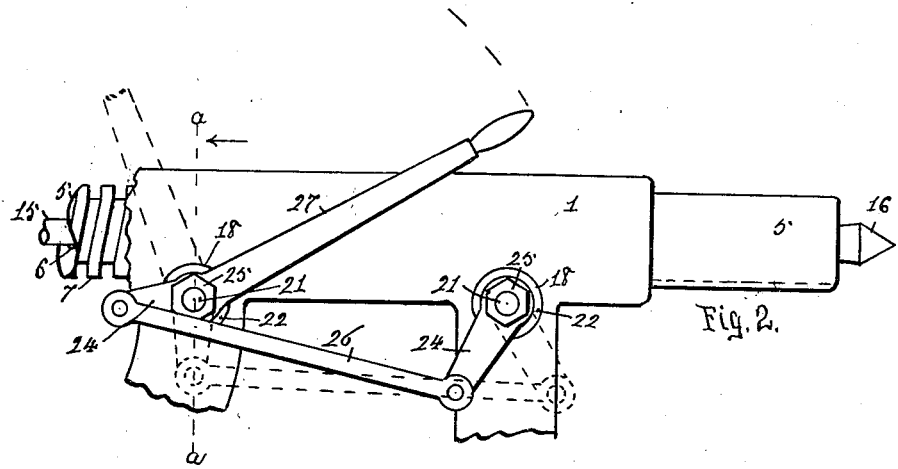
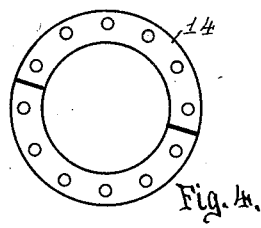
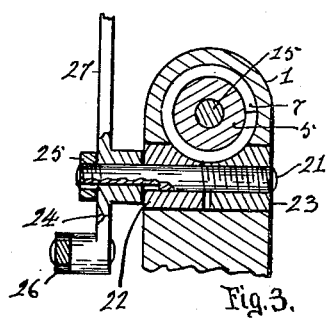
Witnesses,
E. H. French
George F. Jenckes.
William A. Greaves, Inventor,
By Robert S. Carr, Atty.

UNITED STATES PATENT OFFICE.

WILLIAM A. GREAVES, OF CINCINNATI, OHIO, ASSIGNOR TO GREAVES, KLUSMAN & CO., OF CINCINNATI, OHIO, A COPARTNERSHIP.

TAIL-STOCK.

1,005,538.  Specification of Letters Patent. Patented Oct. 10, 1911.

Application filed March 26, 1910. Serial No. 551,768.

*To all whom it may concern:*

Be it known that I, WILLIAM A. GREAVES, a citizen of the United States, residing at Cincinnati, Ohio, have invented a new and useful Improvement in Tail-Stocks, of which the following is a specification.

My invention relates to tail stocks adapted to use on engine lathes or elsewhere, and the objects of my improvements are to provide means for dispensing with the ordinary spindle screw and for moving the spindle by means of a nut which is adjustably threaded thereon; to provide means for movably securing said nut to the barrel; to provide a plural number of clamps for the spindle; to provide lever mechanism for operating said clamps, and to provide such construction and assemblage of the various members as to obtain increased durability and accuracy together with facility of operation and efficiency of action. These objects are attained in the following described manner as illustrated in the accompanying drawings, in which:

Figure 1 is a longitudinal section with parts broken away of a tail stock embodying my improvements; Fig. 2 a rear elevation with parts broken away; Fig. 3 a transverse section on the line *a—a* of Fig. 2, and Fig. 4, a separable flange for movably securing the spindle nut on the barrel.

In the drawings, 1 represents the barrel formed with a longitudinal bore 2 and with a flange 3 on its rear end which is preferably counterbored at 4. The spindle 5 movable longitudinally in said bore 2 is formed with an axial opening 6 therethrough and with external square threads 7 on its rear portion.

A key 8 removably secured in the front portion of the barrel movably engages with the key seat 9 formed in the spindle for preventing the rotative movement thereof and for limiting its longitudinal movement in a forward direction. The spindle nut 10 formed with a hollow rear extension or hub 11 and provided with a hand wheel 12 is internally threaded for the adjustable engagement therewith of the threaded portion of the spindle 5. The front end of the nut 10 is formed with an annular flange 13 and may be rotatively seated within the counterbore 4 of the barrel. A ring 14 formed of two or more parts may be secured over the flange 13 and to the barrel by means of cap screws for preventing any longitudinal movement of the nut 10. A rod 15 loosely inserted through the axial bore of the spindle serves to remove the center 16 by contact with the end of the hub 11 when the spindle is moved to its most rearward position by means of the spindle nut 10. A plurality of pairs of plug clamps 17 are emplaced within the transverse openings 18 which are formed in the barrel to intersect the lower portion of its bore. Each of said pairs of clamps consists of a bolt 21 loosely inserted through one plug 22 and adjustably threaded in the other plug 23 of each pair. A crank arm 24 is splined on each of said bolts adjacent to the corresponding plug 22 and adjustably secured in longitudinal position thereon by means of the adjusting nut 25. A link 26 serves to connect the crank arms together and a hand lever 27 formed on one of said crank arms serves to move them simultaneously with the plugs for clamping or releasing the spindle as shown in Fig. 2. By making the length of the link or connecting rod 26 greater than the distance between the centers of the crank arms, and properly adjusting the clamps by means of the adjusting nuts the movement of the front arm through a short arc midway between its centers serves to actuate the front plugs to complete the clamping of the spindle when the rear arm reaches a point with the link near the dead center. The rear arm may now be moved beyond the center for actuating the rear plugs to complete the clamping of the spindle while the front arm remains substantially unmoved by the link. In this manner the pairs of plugs may be actuated successively for both clamping and for releasing the spindle.

The continued movement of the hand lever 27 in a forward direction and under the same pressure increases the clamping exertion of the front clamping plugs like the action of a knee lever as the link approaches the center of the rear clamping plugs. The front clamping plugs may therefore serve with little exertion on the lever to positively clamp the spindle against extreme end thrust. After the completion of the clamping action of the front plugs the further movement of the lever serves to reasonably tighten the rear plugs to maintain the spindle in perfect alinement and prevent any lateral movement thereof which might occur from its becoming worn within the barrel. The front clamping plugs resist the end thrust of the spindle and the rear ones its lateral movement. The movement of the link past the center of the rear plugs automatically locks the lever with the spindle in clamped position. The successive action of the plugs permits the use of the front clamp only for light work if desired without a full stroke of the lever.

Having fully described my improvement, what I claim as my invention and desire to secure by Letters Patent of the United States is:—

1. A tail stock comprising a barrel, a hollow spindle therein, a nut threaded on the spindle and provided with a hand wheel and with a hollow extended hub having a closed end, means for rotatively securing the nut on the barrel, and a rod movable within the hollow spindle for the purpose specified.

2. A tail stock comprising a barrel, a spindle movable longitudinally therein, independently movable pairs of plugs mounted transversely in the barrel for contacting with and clamping the spindle, crank arms for actuating the respective pairs of plugs, said crank arms being disposed at an angle to each other, one of said arms being provided with a hand lever, and a link connecting said arms together whereby said pairs of plugs may be actuated successively for either clamping or for releasing the spindle by the continued movement of the hand lever in respective opposite directions.

WILLIAM A. GREAVES.

Witnesses:
  H. H. KLUSMAN,
  R. S. CARR.

---

Copies of this patent may be obtained for five cents each, by addressing the "Commissioner of Patents, Washington, D. C."